(12) United States Patent
Potluri et al.

(10) Patent No.: US 10,474,666 B2
(45) Date of Patent: Nov. 12, 2019

(54) METADATA VALIDATION TOOL

(71) Applicant: BANK OF AMERICA CORPORATION, Charlotte, NC (US)

(72) Inventors: Vijaya S. Potluri, Oak Park, CA (US); Sumit Gulati, Agoura Hills, CA (US); Arun Govindarajan, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 534 days.

(21) Appl. No.: 15/291,434

(22) Filed: Oct. 12, 2016

(65) Prior Publication Data
US 2018/0101562 A1 Apr. 12, 2018

(51) Int. Cl.
G06F 16/00 (2019.01)
G06F 16/23 (2019.01)

(52) U.S. Cl.
CPC .......... *G06F 16/2365* (2019.01); *G06F 16/23* (2019.01)

(58) Field of Classification Search
CPC .............................. G06F 16/2365; G06F 16/23
USPC ......................................................... 707/687
See application file for complete search history.

(56) References Cited

U.S. PATENT DOCUMENTS

| 6,405,198 | B1 * | 6/2002 | Bitar ................... G06F 16/2282 |
| 6,714,979 | B1 * | 3/2004 | Brandt ................... H04L 63/166 |
| | | | 709/225 |
| 7,228,437 | B2 * | 6/2007 | Spagna ................... G06F 21/10 |
| | | | 380/228 |

(Continued)

Primary Examiner — Hanh B Thai
(74) Attorney, Agent, or Firm — Michael A. Springs

(57) ABSTRACT

A metadata validation tool includes a retrieval engine, an extraction engine, a preparation engine a validation engine, and an export engine. The retrieval engine receives a sequential data file comprising a data table, the data table comprising a plurality of rows and a plurality of columns and the data table further comprising a plurality of data entries, wherein each data entry is placed in the data table at the intersection of one of the plurality of rows and one of the plurality of columns. The extraction engine extracts metadata from the sequential data file for at least one of the plurality of columns of data, wherein the metadata identifies the data table and a plurality of metadata identifiers. The extraction engine determines a metadata identifier for the extracted metadata, wherein the metadata identifier identifies a data field indicating a data type. The extraction engine determines, using the metadata identifier, a general requirement for at least one of the columns of data, the general requirement indicating the required format for each data entry in the at least one of the columns. The preparation engine generates a routine, the routine based on at least the general requirement, wherein the routine facilitates determining whether one or more of the plurality of data entries complies with the general requirement. The validation performs the routine and determines whether one or more rows of the plurality of rows comprises an error, the error indicating that at least one of the data entries of the one or more rows does not comply with the general requirement. Upon a determination that one or more rows of data comprise an error, the export engine generates a consolidated error report, the error report identifying an input row number indicating the one or more rows that contain the error.

20 Claims, 3 Drawing Sheets

(56) References Cited

U.S. PATENT DOCUMENTS

| | | | | |
|---|---|---|---|---|
| 7,761,841 | B1* | 7/2010 | Rexroad | G06F 11/3688 |
| | | | | 717/100 |
| 9,448,924 | B2* | 9/2016 | Sundaram | G06F 3/0688 |
| 9,836,494 | B2* | 12/2017 | Caudy | G06F 16/9024 |
| 10,049,118 | B2* | 8/2018 | Patel | G06F 16/1748 |
| 2007/0220032 | A1* | 9/2007 | Kapoor | G06F 8/61 |
| 2010/0205475 | A1* | 8/2010 | Ebrahimi | G06F 21/62 |
| | | | | 714/2 |
| 2013/0073525 | A1* | 3/2013 | Damon | G06F 11/0706 |
| | | | | 707/691 |
| 2013/0086133 | A1* | 4/2013 | Mucklow | G06F 8/71 |
| | | | | 707/821 |
| 2013/0246460 | A1* | 9/2013 | Maltbie | G16B 20/00 |
| | | | | 707/771 |
| 2015/0046938 | A1* | 2/2015 | Qian | H04N 21/2353 |
| | | | | 725/25 |
| 2015/0193338 | A1* | 7/2015 | Sundaram | G06F 3/0688 |
| | | | | 711/103 |
| 2016/0078081 | A1* | 3/2016 | Damon | G06F 11/0706 |
| | | | | 707/691 |
| 2016/0147641 | A1* | 5/2016 | Malla | G06F 11/3692 |
| | | | | 717/125 |
| 2016/0335163 | A1* | 11/2016 | Teodorescu | G06F 16/9024 |
| 2016/0337366 | A1* | 11/2016 | Wright | G06F 16/9024 |
| 2016/0350358 | A1* | 12/2016 | Patel | G06F 16/1748 |
| 2017/0124111 | A1* | 5/2017 | Sharma | G06F 16/178 |

* cited by examiner

METADATA VALIDATION TOOL

TECHNICAL FIELD

This disclosure relates generally to metadata and metadata validation.

BACKGROUND

Servers and databases store information in the form of data. In some instances, data is associated with metadata. Metadata describes the data it is associated with. For example, metadata may define data structures such as tables, fields, and/or data types.

SUMMARY OF THE DISCLOSURE

According to an embodiment, a metadata validation tool includes a retrieval engine, an extraction engine, a preparation engine a validation engine, and an export engine. The retrieval engine receives a sequential data file comprising a data table, the data table comprising a plurality of rows and a plurality of columns and the data table further comprising a plurality of data entries, wherein each data entry is placed in the data table at the intersection of one of the plurality of rows and one of the plurality of columns. The extraction engine extracts metadata from the sequential data file for at least one of the plurality of columns of data, wherein the metadata identifies the data table and a plurality of metadata identifiers. The extraction engine determines a metadata identifier for the extracted metadata, wherein the metadata identifier identifies a data field indicating a data type. The extraction engine determines, using the metadata identifier, a general requirement for at least one of the columns of data, the general requirement indicating the required format for each data entry in the at least one of the columns. The preparation engine generates a routine, the routine based on at least the general requirement, wherein the routine facilitates determining whether one or more of the plurality of data entries complies with the general requirement. The validation performs the routine and determines whether one or more rows of the plurality of rows comprises an error, the error indicating that at least one of the data entries of the one or more rows does not comply with the general requirement. Upon a determination that one or more rows of data comprise an error, the export engine generates a consolidated error report, the error report identifying an input row number indicating the one or more rows that contain the error.

According to another embodiment, a method includes receiving a sequential data file comprising a data table, the data table comprising a plurality of rows and a plurality of columns and the data table further comprising a plurality of data entries, wherein each data entry is placed in the data table at the intersection of one of the plurality of rows and one of the plurality of columns. The method further includes extracting metadata from the sequential data file for at least one of the plurality of columns of data, wherein the metadata identifies the data table and a plurality of metadata identifiers. The method further includes determining a metadata identifier for the extracted metadata, wherein the metadata identifier identifies a data field indicating a data type. The method further includes determining, using the metadata identifier, a general requirement for at least one of the columns of data, the general requirement indicating the required format for each data entry in the at least one of the columns. The method further includes generating a routine, the routine based on at least the general requirement, wherein the routine facilitates determining whether one or more of the plurality of data entries complies with the general requirement. The method further includes performing the routine. The method further includes determining whether one or more rows of the plurality of rows comprises an error, the error indicating that at least one of the data entries of the one or more rows does not comply with the general requirement. Upon a determination that one or more rows of data comprise an error, the method further includes generating a consolidated error report, the error report identifying an input row number indicating the one or more rows that contain the error.

According to yet another embodiment, a system includes a database and a metadata validation tool. The metadata validation tool receives a sequential data file from the database, the sequential data file comprising a data table, the data table comprising a plurality of rows and a plurality of columns and the data table further comprising a plurality of data entries, wherein each data entry is placed in the data table at the intersection of one of the plurality of rows and one of the plurality of columns. The metadata validation tool extracts metadata from the sequential data file for at least one of the plurality of columns of data, wherein the metadata identifies the data table and a plurality of metadata identifiers. The metadata validation tool determines a metadata identifier for the extracted metadata, wherein the metadata identifier identifies a data field indicating a data type. The metadata validation tool determines, using the metadata identifier, a general requirement for at least one of the columns of data, the general requirement indicating the required format for each data entry in the at least one of the columns. The metadata validation tool generates a routine, the routine based on at least the general requirement, wherein the routine facilitates determining whether one or more of the plurality of data entries complies with the general requirement. The metadata validation tool performs the routine. The metadata validation tool determines whether one or more rows of the plurality of rows comprises an error, the error indicating that at least one of the data entries of the one or more rows does not comply with the general requirement. Upon a determination that one or more rows of data comprise an error, the metadata validation tool generates a consolidated error report, the error report identifying an input row number indicating the one or more rows that contain the error.

Certain embodiments provide one or more technical advantages. For example, an embodiment improves processing speed by ensuring that metadata is system agnostic. As another example, an embodiment reduces processing and memory usage by reducing data errors. For example, an embodiment reduces data errors by ensuring data completeness. Some embodiments may reduce data errors by determining whether data is in a correct format. In these embodiments, metadata may be used to facilitate determining that one or meta data entries require particular formatting. The data entries may be parsed to ensure that the data entries are in the required format. This reduces errors caused by packet loss, keying errors, memory leaks, etc. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
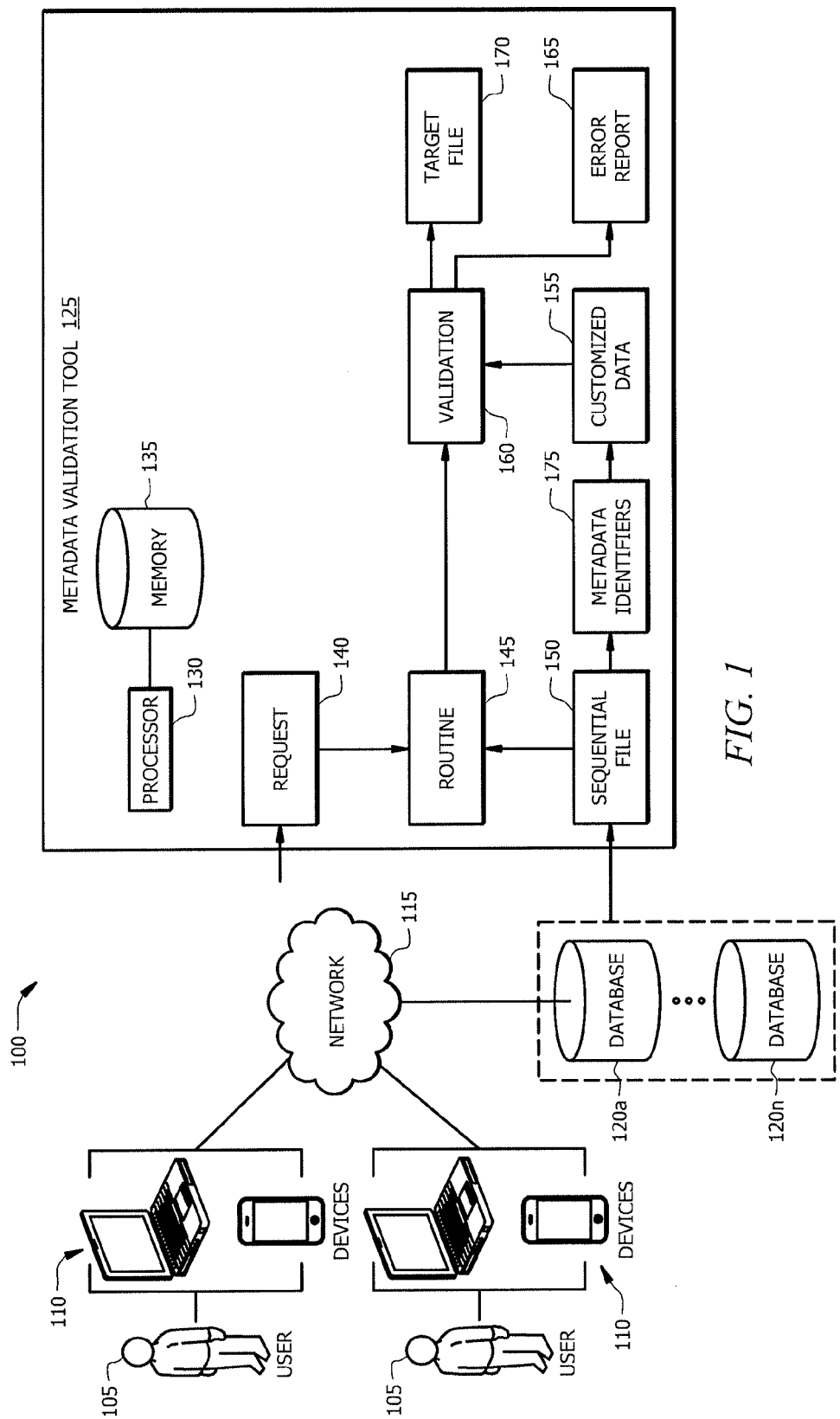
FIG. 1 illustrates a system for metadata validation.
Figure 2:
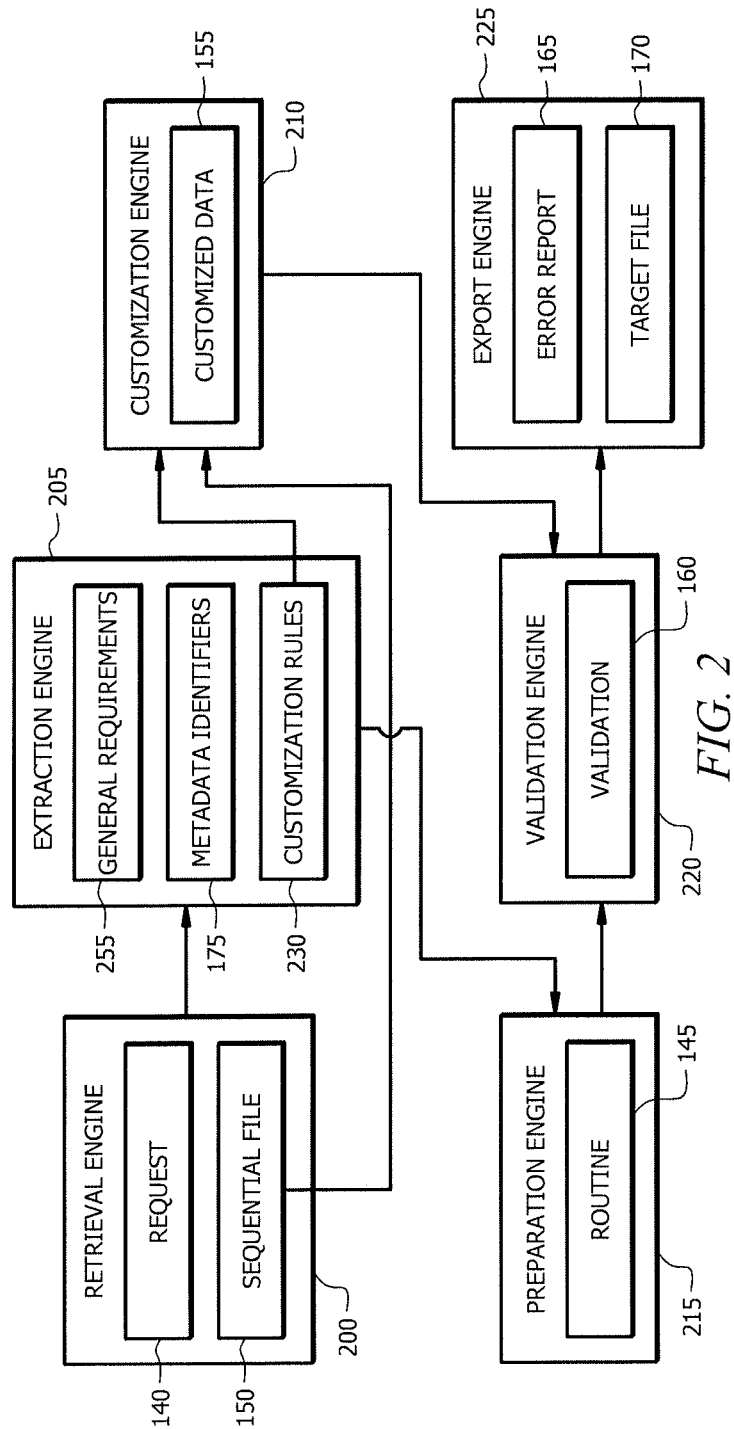
FIG. 2 illustrates the metadata validation tool of the system of FIG. 1.
Figure 3:
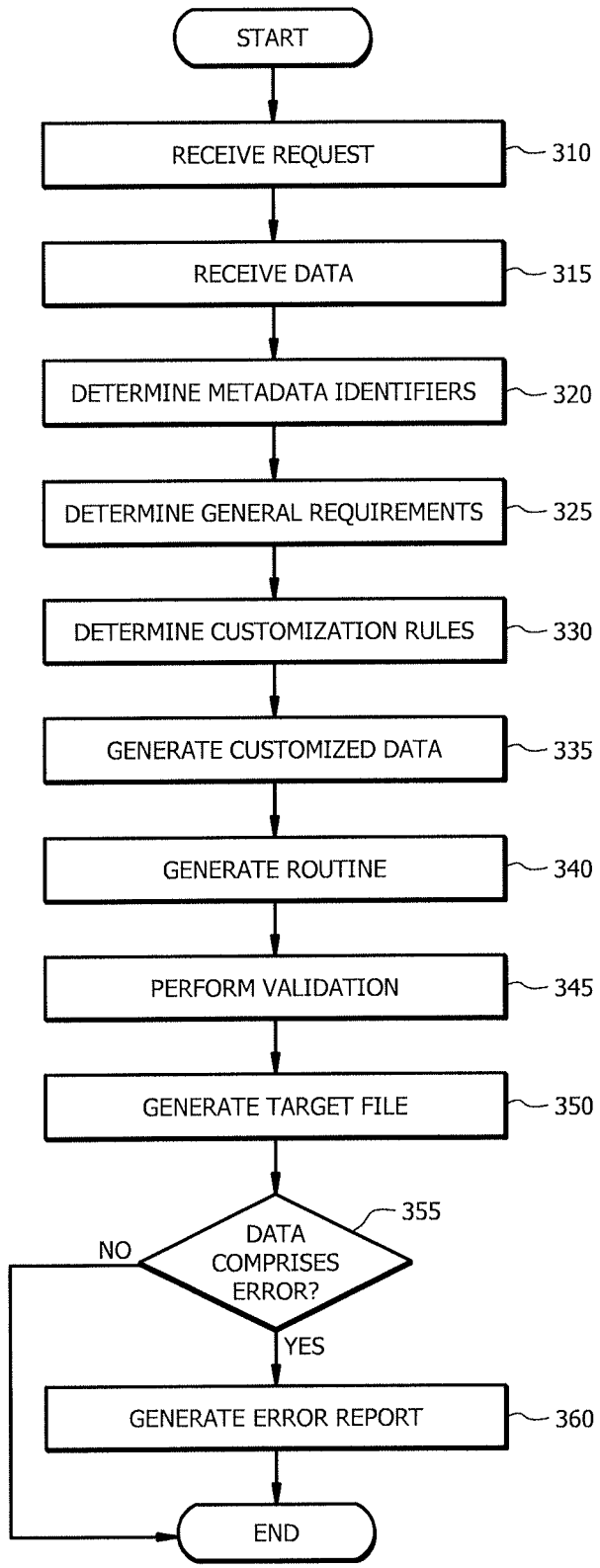
FIG. 3 is a flowchart illustrating a method for metadata validation using the system of FIG. 1.

Embodiments of the present disclosure and its advantages are best understood by referring to FIGS. 1 through 3 of the drawings, like numerals being used for like and corresponding parts of the various drawings.

Servers and databases store and use information in the form of data. Data may be stored on flat files, and the data stored on the flat files may be extracted for storage in data tables. In some instances, one or more data entries may comprise errors. For example, data could comprise keystroke errors. As another example, an enterprise may experience data loss (e.g., in data communication), resulting in an incomplete dataset. An enterprise may also experience packet loss during the communication of a dataset. Data errors in a dataset may render processing the dataset impossible. For example, a machine executing a data processing algorithm may expect to receive data in a certain format. If the data is not in the expected format, the machine may be unable to process the dataset. As another example, data errors may cause unacceptable data processing results, requiring the dataset to be reprocessed. Data errors in a dataset may be corrected before the dataset is reprocessed. Reprocessing data due to data errors may cause an increase of the processing and/or memory usage of the machines processing the dataset.

This disclosure contemplates a metadata validation tool that performs customized metadata validation and creates a consolidated error report to maintain and/or improve data integrity. The metadata validation tool determines the validity of one or more data entries. For example, the metadata validation tool may split a row of data into columns, extract one or more columns, and perform validation on each data entry in column based on its associated metadata. For example, the metadata validation tool may determine, using metadata associated with the column, that data entries in the column require a particular format type. For example, the metadata validation tool may determine that the data entries should be a particular date format, a particular time format, a particular timestamp format, or any other particular format type. The metadata validation tool may parse one or more data entries in the column to validate the data entries in the column, and may therefore identify data errors. This may provide the advantage of maintaining data integrity by reducing data errors. As discussed, a machine may only be configured to process data entries in a certain format. If a data errors causes a data error to not conform to the format, data processing may fail. Furthermore, machines may not recognize obvious data errors and create erroneous data processing results because of the data errors. These erroneous results may require that a dataset be processed a second time, which consumes additional computer resources. This disclosure contemplates eliminating or reducing erroneous data processing results, thus reducing the processor and memory resources required to produce valid data processing results. If data entries do not comprise an error, or if the data entries comprise less than a predetermined number of errors, the data entries may be written to a target file and stored on a database.

FIG. 1 illustrates a system 100 for metadata validation. As illustrated in FIG. 1, system 100 includes users 105, devices 110, network 115, databases 120, and metadata validation tool 125. In particular embodiments, system 100 reduces processing and memory demand in a data communication and storage environment by ensuring the integrity of the data.

Devices 110 may be any devices that operate and/or communicate with other components of system 100. In general, devices 110 request metadata validation. For example, devices 110 communicate request 140 to metadata validation tool 125 or any other suitable component of system 100. Devices 110 may be associated with an enterprise or a business unit within an enterprise. Devices 110 and/or their associated enterprises may collect and/or consume data. For example, enterprises may collect data and store the data on flat files. Devices 110 may communicate a request to perform metadata validation on the flat file and store the data in a database. As another example, an enterprise may consume data stored on flat files. Devices 110 may communicate a request for data stored on flat files and request to perform metadata validation before consuming the data.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 comprises databases 120*a-n*, where n represents any suitable number. For example, system 100 may comprise a single database 120 or any number of databases 120. Databases 120 store data to be processed. For example, the data may be contained in a flat file. This disclosure contemplates databases 120 storing any suitable data type. For example, databases 120 may store any type of data to be validated.

Data in database 120 may comprise errors. For example, data could comprise keystroke errors. As another example, an enterprise may experience data loss (e.g., in data communication), resulting in an incomplete dataset. Data errors in a dataset may render processing the dataset impossible. For example, a machine executing a data processing algorithm may expect to receive data a certain format. If the data is not in the expected format, the machine may not be able to process the dataset. As another example, data errors may cause unacceptable data processing results, requiring a dataset to be reprocessed. Data errors in a dataset may be corrected before the dataset is reprocessed. Reprocessing data due to data errors may cause an increase of the processing and/or memory usage of the machines processing the dataset.

Metadata validation tool 125 performs metadata validation and generates consolidated error reports for data stored in databases 120 to maintain and/or improve data integrity. As illustrated in FIG. 1, metadata validation tool 125 includes a processor 130 and memory 135. This disclosure contemplates processor 130 and memory 135 being configured to perform any of the operations of metadata validation tool 125 described herein. In particular embodiments, metadata validation tool 125 reduces processing and memory demand in a data communication and storage environment by insuring the integrity of the data.

Processor 130 is any electronic circuitry, including, but not limited to microprocessors, application specific integrated circuits (ASIC), application specific instruction set processor (ASIP), and/or state machines, that communicatively couples to memory 135 and controls the operation of metadata validation tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory 135 and executes them by directing the coordinated operations of the ALU, registers and other components. Processor 130 may include other hardware and software that operates to control and process information. Processor 130 executes software stored on memory 135 to perform any of the functions described herein. Processor 130 controls the operation and administration of metadata validation tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store data sequential file 150, general requirements 255, and/or customization rules 230. This disclosure contemplates memory 135 storing any of the elements stored in databases 120 and/or by metadata validation tool 125.

In an exemplary embodiment, metadata validation tool 125 receives a request 140. Request 140 may indicate a request to perform metadata validation. Request 140 may indicate a request to store data associated with a flat file stored in database 120. Request 140 may further include requirements for the dataset, such as customization rules 230 and/or general requirements 255, both described in further detail in relation to FIG. 2. In an embodiment, metadata validation is performed in response to request 140 before storing and/or consuming the data.

In response to receiving request 140, metadata validation tool 125 may retrieve a flat file from database 120. In an embodiment, the flat file is sequential file 150. Generally, sequential file 150 comprises data that requires validation to complete request 140. For example, metadata validation may analyze sequential file 150 to determine whether data contained in sequential file 150 is complete and accurate.

Metadata validation tool 125 may analyze request 140 and sequential file 150 to generate routine 145. Routine 145 may be a custom routine developed to facilitate validating the data in sequential file 150. Routine 145 further facilitates generating error report 165. In an embodiment, routine 145 if a C++ routine. Routine 145 may be a routine written in any suitable computer programming language.

Metadata validation tool 125 may extract metadata identifiers 175 from sequential file 150. Generally, metadata identifiers 175 identifies metadata in sequential file 150. In an embodiment, the metadata is technical metadata. For example, metadata identifiers 175 may indicate whether sequential file 150 is a fixed width file, whether sequential file 150 is a delimited file, the delimiter in sequential file 150 (in the case that sequential file 150 is a delimited file), and/or the number of columns in sequential file 150. Metadata identifiers 175 may identify data structures, such as tables, fields, and data types associated with sequential file 150. Metadata identifiers 175 may identify a data field. In an embodiment, metadata identifiers 175 may identify metadata associated with one or more columns of data in the sequential file 150. For example, metadata identifiers 175 may identify the name, position, data type, length, scale (in the case of a decimal column), and nullability of one or more columns.

Metadata validation tool 125 may perform validation 160. Generally, validation 160 determines the completeness and accuracy of data in sequential file 150 and/or customized data 155. In an embodiment, metadata validation tool 125 utilizes routine 145 to perform validation 160. In an embodiment, metadata validation tool 125 performs validation 160 by receiving a row of data and determining whether each data entry in the row conforms to the general requirements 255 for the column associate with the data entry. For example, the general requirements 255 may specify that a data entry must conform to a particular format. General requirements 255 are described in more detail in relation to FIG. 2. In an embodiment, metadata tool 125 outputs a deliminated row of data that is written to target file 170 and/or error report 165.

Metadata validation tool 125 may write data to target file 170. Generally, target file 170 is stored on a database. In an embodiment, the data stored on target file 170 is accurate and can be trusted by enterprises for consumption. In an embodiment, when metadata tool 125 determines that a row of data does not contain an error, metadata validation tool 125 writes the row of data to target file 170. In a further embodiment, metadata tool 125 writes a row of data to target file 170 if the row has less than a predetermined number of errors. Metadata validation tool 125 may write data to target file 170 when validation 160 does not determine any errors (or less than a predetermined number of errors) in sequential file 150 and/or customized data 155.

If metadata validation tool 125 determines that a row of data comprises an error using validation 160, metadata validation tool 125 may write the row of data to error report 165. In an embodiment, metadata validation tool 125 does not write the row of data to error report 165, but writes details of the one or more errors to error report 165. Error report 165 generally indicates errors in sequential file 150 and/or customized data 155. For example, if a data entry does not conform with one or more general requirements 255, validation 160 may determine that the data entry comprises an error. Error report 165 may provide an error description for the error. For example, an error description may indicate one or more of the row number, input row number where the error occurs, the name of the column in which the errors occurs, the position of the column in which the error occurs, and the actual issue causing the error. The actual issue causing the error may indicate the general requirements(s) 255 that the data entry failed to conform. Writing error descriptions in the consolidated error report 165 allows for errors to be efficiently tracked and corrected before being written to target file 170.

Modifications, additions, or omissions may be made to system 100 without departing from the scope of the invention. For example, system 100 may include any number of processors 130, memory 135, devices 110, and/or databases 120. As a further example, metadata validation tool 125 may not create customized data 155. In this example, metadata validation tool 125 performs validation 160 on data in sequential file 150. Metadata validation tool 125 may perform validation 160 on data in sequential file 150, customized data 155, or any combination of sequential file 150 and customized data 155. Furthermore, the components of system 100 may be integrated or separated. For example, in particular implementations, memory 135 may be separated into multiple memories 135 to store the data descried herein.

FIG. 2 illustrates the metadata validation tool 125 of the system 100 of FIG. 1. As illustrated in FIG. 2, metadata validation tool 125 includes retrieval engine 200, extraction engine 205, customization engine 210, preparation engine 215, validation engine 220, and export engine 225. In particular embodiments, metadata validation tool 125 reduces processing and memory demand in a data communication and storage environment by insuring the integrity of the data.

Retrieval engine 200 receives request 140 and sequential file 150. In particular embodiments, retrieval engine 200 receives request 140 from one or more devices 110. An example algorithm for retrieval engine 200 is as follows: wait for request 140; receive request 140 from one or more devices 110; in response to receiving request 140, retrieve sequential file 150 from database 120; receive sequential file 150; send request 140 and sequential file 150 to extraction engine 205. In an embodiment, retrieval engine 200 may only send sequential file 150 to extraction engine 205.

Extraction engine 205 extracts general requirements 255 from request 140. Extraction engine 205 may further extract metadata identifiers 175 from sequential file 150. Extraction engine 205 may further extract customization rules 230 from request 140 and/or sequential file 150. Generally, metadata identifiers 175 identifies metadata in sequential file 150. In an embodiment, the metadata is technical metadata. For example, metadata identifiers 175 may indicate whether sequential file 150 is a fixed width file, whether sequential file 150 is a delimited file, the delimiter in sequential file 150 (in the case that sequential file 150 is a delimited file), and/or the number of columns in sequential file 150. Metadata identifiers 175 may identify metadata associated with one or more columns of data in the sequential file 150. For example, metadata identifiers 175 may identify the name, position, data type, length, scale (in the case of a decimal column), and nullability of one or more columns. An example algorithm for extraction engine 205 to extract metadata identifiers 175 is as follows: receive notification from retrieval engine 200 that request 140 has been received; analyze sequential file 150 to determine metadata identifiers 175.

Extraction engine 205 may further extract general requirements 255 from request 140 and/or sequential file 150. Generally, general requirements 255 are requirements used by metadata validation tool 125 to determine whether particular data entries comprise an error. In an embodiment, each column in a row of data is associated with one or more particular general requirements 255. In an embodiment one or more general requirements 255 may apply to more than a single column of data. For example, general requirements 255 may apply to an entire sequential file 150 and/or customized data 155. Example general requirements may include delimiter requirement, row length requirement NULL requirement, character requirement, integer requirement, decimal requirement, date requirement, time requirement, timestamp requirement, and/or unknown datatype requirement. In an embodiment, general requirements 255 may be stored in a table. An example algorithm for extraction engine 205 to extract general requirements 255 is as follows: receive notification from retrieval engine 200 that request 140 has been received; analyze sequential file 150 and request 140 to determine general requirements 255.

Generally, a delimiter requirement indicates the number of delimiters expected in a dataset. In a delimited file, a certain number of delimiters may be expected in a row of data. As another example, a certain number of delimiters may be expected in a dataset, such as the dataset in sequential file 150 and/or customized data 155. If the number of delimiters does not equal the number of expected delimiters, metadata validation tool 125 may determine that there is an error in validation 160.

Row length requirement may indicate the number of characters expected in a row of data. If the actual number of characters is greater than or less than the expected number of characters, metadata validation tool 125 may generate an error for the row of data at validation 160. In an embodiment, row length requirement may indicate the expected number of predetermined characters. For example, row length requirement may indicate the expected number of characters that are not spaces, delimiters, and/or any other type of character.

NULL requirement may indicate whether a NULL value is expected and/or permitted. For example, NULL requirement indicates that data entries in a particular column should not comprise a NULL value. In another embodiment, NULL requirement may indicate that a NULL value for data entries in a particular column is permissible.

Character requirement may indicate that a character is expected in a column of data entries. Character check requirement may also indicate that, if a data entry comprises characters, the characters are expected to conform to certain length requirements.

Integer requirement may indicate whether an integer is expected in a column of data entries. Integer requirement may also indicate that, if a data entry comprises integers, the integers are expected to conform to certain length requirements.

Decimal requirement may indicate that integers with fractional components conform to certain requirements. For example, decimal requirement may indicate that decimals are to be rounded to a certain scale.

Date requirement may indicate that a date value is expected in a column of data entries. Date requirement may further indicate the expected format for a date entry (e.g., YY/M/D, M/D/YYYY, M-D-YY, MDYY, etc.).

Time requirement may indicate that a time value is expected in a column of data entries. Time requirement may further indicate the expected format for a time entry (e.g., HHMMSS, HH:MM:SS, HH:MM, etc). Time requirement may further indicate that time entries are expected to be entered in 24-hour format, a 12-hour format, or any other suitable format.

Timestamp requirement may indicate that date and time value is expected in a column of data entries. Timestamp requirement may further indicate the expected format of the timestamp (e.g., YY/M/D/HH/MM/SS, etc.).

Unknown datatype requirement may indicate that that a data entry has an unknown datatype. For example, unknown datatype may indicate that only certain data is valid. For example, characters, integers, etc. may be known. However, if there is a type of data that is not recognized, unknown datatype may indicate that the data type is not known and facilitate generating an error.

Extraction engine 205 may further extract customization rules 230 from request 140 and/or sequential file 150. Generally, customization rules 230 are requirements used revise the data in sequential file 150 before metadata validation tool 125 performs validation 160. For example, customization rules 230 may indicate whether a particular data entry, column of data entries, and/or rows of data entries should be modified before performing validation 160. Customization rules 230 may indicate whether data should be trimmed, whether data should be rounded to a certain scale, whether NULL input values should be replaced with default values, whether to truncate data, whether to remove data, whether to change uppercase to lowercase and vice versa, and whether to nullify data. An example algorithm for extraction engine 205 to extract general requirements 255 is as follows: receive notification from retrieval engine 200 that request 140 has been received; analyze sequential file 150 and request 140 to determine customization rules 230.

Customization engine 210 applies customization rules 230 to the data in sequential file 150 to generate customized data 155. As discussed the data in sequential file 150 may be modified before metadata validation tool 125 performs validation 160. In an embodiment, customization engine 155 modifies metadata identifiers 175. Systems across an enterprise may expect to receive metadata in a particular format. Customization engine 210 may modify metadata identifiers 175 so that the metadata is in the expected format. This allows the data to be system agnostic and to be shared across multiple systems without have metadata mismatch issues.

Preparation engine 215 generates routine 145. Routine 145 may be a custom routine developed to facilitate validating the data in sequential file 150. Routine 145 further facilitate generating error report 165. In an embodiment, routine 145 if a C++ routine. In an embodiment, preparation engine 215 receives general requirements 255 to generate routine 145. Preparation engine 215 may further receive request 140, sequential file 150, metadata identifiers 175, and/or customized data 155 to generate routine 145. In an embodiment, general requirements 255 may be stored in a table. In this embodiment, preparation engine 215 may generate routine 145 by exporting the table to XML. General requirements 255 may also place the XML in memory, e.g., memory 135, to be used by validation engine 230. An example algorithm for preparation engine 215 to create routine 145 is as follows: wait to receive general requirements 255; receive general requirements 255; analyze general requirements 255; and generate routine 145 based on general requirements 255.

Validation engine 220 performs validation 160. In an embodiment, metadata validation tool 125 may execute routine 145 to perform validation 160. Performing validation 160 may comprise analyzing data row by row. For example, validation engine may utilize routine 145 to analyze customized data 155 and/or the data stored in sequential file 150. In an embodiment, validation engine 220 may perform an initial cleansing of data before determining if the data conforms with general requirements 255. As an example, validation engine 220 may remove the ACII character 13 and 00 before determining whether the data comprises errors. As an additional example, validation engine 220 may remove empty lines, headers, and/or trailers before determining whether the data comprises errors. Validation engine 220 may perform validation 160 to determine whether input data comprises errors. For example, validation engine 220 may determine whether one or more data entries comply with general requirements 255. An example algorithm for validation engine 220 to perform validation 160 is as follows: receive routine 145; receive customized data 155; execute routine 145 to determine whether customized data 155 comprises error(s).

Export engine 225 generates error report 165 and/or target file 170. As discussed, validation engine 220 may receive input data (e.g., data in sequential file 150 and/or customized data 155). Validation engine 220 validates each row of data as discussed and communicates the data to export engine 225. If a row of data does not have any errors, the data is written to target file 170. As another example, engine 225 may row a row of data to target file 170 if the row of data has less than a predetermined number of errors. As yet a further example, export engine 225 may receive the entire results from a validation 160 job and write the data to target file 170 if export engine 225 determines that the data has less than a predetermined number of errors. An example algorithm for export engine 225 to generate target file 170 is as follows: receive input data from validation engine 220; receive validation 160 results from validation engine 220; write data to target file 170 upon a determination that the data has less than a predetermined number of errors.

Export engine 225 may further generate error report 165. Error report 165 generally indicates errors in sequential file 150 and/or customized data 155. For example, if a data entry does not conform with one or more general requirements 255, validation 160 may determine that the data entry comprises an error. Error report 165 may provide an error description for the error. For example, an error description may indicate one or more of the row number, input row number where the error occurs, the name of the column in which the errors occurs, the position of the column in which the error occurs, and the actual issue causing the error. The actual issue causing the error may indicate the general requirements(s) 255 that the data entry failed to conform. Writing error descriptions in the consolidated error report 165 allows for errors to be efficiently tracked and corrected before being written to target file 170. As discussed, validation engine 220 may receive input data (e.g., data in sequential file 150 and/or customized data 155). Validation engine 220 validates each row of data as discussed and communicates the data to export engine 225. If a row of data comprises one or more errors, input data (e.g., the entire row or the data entry comprising an error) may be written to error report 165. In an embodiment, input data may not be written to error report 165, and only the error description is written to error report 165. An example algorithm for export engine 225 to generate target file 170 is as follows: receive input data from validation engine 220; receive validation 160 results from validation engine 220; write error description to error report 165 upon a determination that the data has an error.

Modifications, additions, or omissions may be made to metadata validation tool 125 without departing from the scope of the invention. For example, metadata validation tool 125 may include any number of processors 130 and/or memories 135. As a further example, metadata validation tool 125 may not create customized data 155. In this example, metadata validation tool 125 performs validation 160 on data in sequential file 150. Metadata validation tool 125 may perform validation 160 on data in sequential file 150, customized data 155, or any combination of sequential file 150 and customized data 155. As another example, metadata validation tool may not generate general requirements 255 and/or customized data 155 in response to request 140. For example, generate requirements 255 and/or customized data 155 may be created prior to request 140 and stored on, e.g., memory 135.

FIG. 3 is a flowchart illustrating a method 300 for performing validation 160 using the system 100 of FIG. 1. In particular embodiments, metadata validation tool 125 performs method 300. By performing method 300, metadata validation tool 125 reduces processing and memory demand in a data communication and storage environment by insuring the integrity of the data.

Metadata validation tool 125 begins by receiving a request 140 to validate data in step 310. In step 315, metadata validation tool 125 receives data (e.g., sequential file 150) from servers 120. Metadata validation tool 125 determines metadata identifiers 175 in step 320, general requirements 255 in step 325, and customization rules 230 in step 330.

In step 335, metadata validation tool 125 generates customized data 155. Metadata validation tool 125 generates routine 145 in step 340. Metadata validation tool 125 executes routine 145 to perform validation 160 in step 345 and generates target file 170 in step 350. In step 355, metadata validation tool 125 determines whether validation 160 determined any errors. If metadata validation tool 125 did not determine errors, the method ends. If metadata validation tool 125 did determine one more errors, metadata validation tool 125 generates error report 165 before the method ends.

Modifications, additions, or omissions may be made to method 300 depicted in FIG. 3. Method 300 may include more, fewer, or other steps. For example, steps may be performed in parallel or in any suitable order. While discussed as metadata validation tool 125 performing the steps, any suitable component of system 100, such as device(s) 110 for example, may perform one or more steps of the method. While this disclosure may discuss metadata validation tool 125 performing validation 160 on customized data 155, metadata validation tool 125 may perform validation 160 on the data in sequential file 150 or any other suitable data.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A metadata validation tool comprising a hardware processor configured to:
    implement a retrieval engine configured to:
        receive a request to validate data stored in a sequential data file; and
        in response to receiving the request:
            retrieve the sequential data file comprising a data table from a database, the data table comprising a plurality of rows and a plurality of columns and the data table further comprising a plurality of data entries, wherein each data entry is placed in the data table at the intersection of one of the plurality of rows and one of the plurality of columns; and
            send the request and the sequential data file to an extraction engine;
    implement the extraction engine configured to:
        receive the request and the sequential data file from the retrieval engine;
        extract metadata from the sequential data file for at least one of the plurality of columns of data, wherein the metadata identifies the data table and a plurality of metadata identifiers;
        extract a customization rule from the request, the customization rule indicating a modification to be performed on at least one data entry, the modification comprising at least one of rounding the at least one data entry to a certain scale, truncating the at least one data entry, changing uppercase letters to lowercase letters in the at least one data entry, changing lowercase letters to uppercase letters in the at least one data entry, and removing the at least one data entry;
        revise the at least one data entry to comply with the customization rule;
        determine a metadata identifier for the extracted metadata, wherein the metadata identifier identifies a data field indicating a data type;
        determine, using the metadata identifier, a general requirement for at least one of the columns of data, the general requirement indicating the required format for each data entry in the at least one of the columns; and
        send the sequential data file and the general requirement to a preparation engine;
    implement the preparation engine configured to:
        receive the sequential data file and the general requirement;
        generate a routine, the routine based on at least the general requirement, wherein the routine facilitates determining whether one or more of the plurality of data entries complies with the general requirement; and
        send the sequential data file and the routine to a validation engine; and
    implement the validation engine configured to:
        perform the routine; and
        determine whether one or more rows of the plurality of rows comprises an error, the error indicating that at least one of the data entries of the one or more rows does not comply with the general requirement; and
    upon a determination that one or more rows of data comprise an error, implement an export engine configured to:
        generate a consolidated error report, the error report identifying an input row number indicating the one or more rows that contain the error;

determine that the one or more rows of data have less than a predetermined number of errors; and in response to determining that the one or more rows of data have less than the predetermined number of errors:

write the one or more rows of data to a target file, the target file comprising fewer rows than the plurality of rows; and store the target file in the database.

2. The metadata validation tool of claim 1, wherein:

the request to validate the data stored in the sequential data file is sent from a device; and the export engine is further configured to send the target file to the device, in response to determining that the one or more rows of data have less than the predetermined number of errors.

3. The metadata validation tool of claim 2, wherein the routine is written in a computer programming language.

4. The metadata validation tool of claim 1, wherein the metadata identifier indicates one or more of the name of the column, the position of the column, the data type of the column, the format of the column, the scale of the column, and whether the column is nullable.

5. The metadata validation tool of claim 1, wherein the general requirement comprises one of a delimiter check, a row length check, a NULL check, a character check, an integer check, a decimal check, a date check, a time check, a timestamp check, and an unknown datatype check.

6. The metadata validation tool of claim 1, wherein the error report further indicates the metadata identifier and an error description associated with the error.

7. The metadata validation tool of claim 1, wherein the validation engine is further configured to perform an initial cleansing of the data entries of the one or more rows of the plurality of rows before determining whether the one or more rows of the plurality of rows comprises the error.

8. A method comprising:

receiving a request to validate data stored in a sequential data file;

retrieving the sequential data file comprising a data table from a database, the data table comprising a plurality of rows and a plurality of columns and the data table further comprising a plurality of data entries, wherein each data entry is placed in the data table at the intersection of one of the plurality of rows and one of the plurality of columns;

extracting metadata from the sequential data file for at least one of the plurality of columns of data, wherein the metadata identifies the data table and a plurality of metadata identifiers;

extracting a customization rule from the request, the customization rule indicating a modification to be performed on at least one data entry, the modification comprising at least one of rounding the at least one data entry to a certain scale, truncating the at least one data entry, changing uppercase letters to lowercase letters in the at least one data entry, changing lowercase letters to uppercase letters in the at least one data entry, and removing the at least one data entry;

revising the at least one data entry to comply with the customization rule;

determining a metadata identifier for the extracted metadata, wherein the metadata identifier identifies a data field indicating a data type;

determining, using the metadata identifier, a general requirement for at least one of the columns of data, the general requirement indicating the required format for each data entry in the at least one of the columns;

generating a routine, the routine based on at least the general requirement, wherein the routine facilitates determining whether one or more of the plurality of data entries complies with the general requirement;

performing the routine;

determining whether one or more rows of the plurality of rows comprises an error, the error indicating that at least one of the data entries of the one or more rows does not comply with the general requirement;

upon a determination that one or more rows of data comprise an error, generating a consolidated error report, the error report identifying an input row number indicating the one or more rows that contain the error;

determining that the one or more rows of data have less than a predetermined number of errors; and in response to determining that the one or more rows of data have less than the predetermined number of errors:

writing the one or more rows of data to a target file, the target file comprising fewer rows than the plurality of rows; and storing the target file in the database.

9. The method of claim 8, wherein:

the request to validate the data stored in the sequential file is sent from a device; and the method further comprising sending the target file to the device, in response to determining that the one or more rows of data have less than the predetermined number of errors.

10. The method of claim 9, wherein the routine is written in a computer programming language.

11. The method of claim 8, wherein the metadata identifier indicates one or more of the name of the column, the position of the column, the data type of the column, the format of the column, the scale of the column, and whether the column is nullable.

12. The method of claim 8, wherein the general requirement comprises one of a delimiter check, a row length check, a NULL check, a character check, an integer check, a decimal check, a date check, a time check, a timestamp check, and an unknown datatype check.

13. The method of claim 8, wherein the error report further indicates the metadata identifier and an error description associated with the error.

14. The method of claim 8, further comprising:

performing an initial cleansing of the data entries of the one or more rows of the plurality of rows before determining whether the one or more rows of the plurality of rows comprises the error.

15. A system comprising:

a database; and a metadata validation tool comprising a hardware processor configured to:

receive a request to validate data stored in a sequential data file;

retrieve the sequential data file from the database, the sequential data file comprising a data table, the data table comprising a plurality of rows and a plurality of columns and the data table further comprising a plurality of data entries, wherein each data entry is placed in the data table at the intersection of one of the plurality of rows and one of the plurality of columns;

extract metadata from the sequential data file for at least one of the plurality of columns of data, wherein the metadata identifies the data table and a plurality of metadata identifiers;

extract a customization rule from the request, the customization rule indicating a modification to be performed on at least one data entry, the modification comprising at least one of rounding the at least one data entry to a certain scale, truncating the at least one data entry, changing uppercase letters to lowercase letters in the at least one data entry, changing lowercase letters to uppercase letters in the at least one data entry, and removing the at least one data entry;

revise the at least one data entry to comply with the customization rule;

determine a metadata identifier for the extracted metadata, wherein the metadata identifier identifies a data field indicating a data type;

determine, using the metadata identifier, a general requirement for at least one of the columns of data, the general requirement indicating the required format for each data entry in the at least one of the columns;

generate a routine, the routine based on at least the general requirement, wherein the routine facilitates determining whether one or more of the plurality of data entries complies with the general requirement;

perform the routine;

determine whether one or more rows of the plurality of rows comprises an error, the error indicating that at least one of the data entries of the one or more rows does not comply with the general requirement;

upon a determination that one or more rows of data comprise an error, generate a consolidated error report, the error report identifying an input row number indicating the one or more rows that contain the error;

determine that the one or more rows of data have less than a predetermined number of errors; and in response to determining that the one or more rows of data have less than the predetermined number of errors:
  write the one or more rows of data to a target file, the target file comprising fewer rows than the plurality of rows; and
  store the target file in the database.

16. The system of claim 15, wherein:
the request to validate the data stored in the sequential data file is sent from a device; and
the export engine is further configured to send the target file to the device, in response to determining that the one or more rows of data have less than the predetermined number of errors.

17. The system of claim 16, wherein the routine is written in a computer programming language.

18. The system of claim 15, wherein the metadata identifier indicates one or more of the name of the column, the position of the column, the data type of the column, the format of the column, the scale of the column, and whether the column is nullable.

19. The system of claim 15, wherein the general requirement comprises one of a delimiter check, a row length check, a NULL check, a character check, an integer check, a decimal check, a date check, a time check, a timestamp check, and an unknown datatype check.

20. The system of claim 15, wherein the error report further indicates the metadata identifier and an error description associated with the error.

* * * * *